United States Patent
Kanasugi et al.

(10) Patent No.: US 9,643,478 B2
(45) Date of Patent: May 9, 2017

(54) VEHICLE PRESS DOOR STRUCTURE AND DOOR GLASS RUN

(71) Applicant: TOYOTA JIDOSHA KABUSHIKI KAISHA, Toyota-shi (JP)

(72) Inventors: Hideaki Kanasugi, Toyota (JP); Yasuhide Matsuo, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/896,599

(22) PCT Filed: Jun. 26, 2014

(86) PCT No.: PCT/IB2014/001188
§ 371 (c)(1),
(2) Date: Dec. 7, 2015

(87) PCT Pub. No.: WO2014/207541
PCT Pub. Date: Dec. 31, 2014

(65) Prior Publication Data
US 2016/0129772 A1    May 12, 2016

(30) Foreign Application Priority Data
Jun. 27, 2013 (JP) ................. 2013-135478

(51) Int. Cl.
*E06B 7/16* (2006.01)
*B60J 5/04* (2006.01)
*B60J 10/76* (2016.01)

(52) U.S. Cl.
CPC ............. *B60J 5/0402* (2013.01); *B60J 10/76* (2016.02)

(58) Field of Classification Search
CPC ................. B60J 10/76; B60J 5/0402
(Continued)

(56) References Cited

U.S. PATENT DOCUMENTS 7,410,203 B2 * 8/2008 Yatsuda et al. ............ 296/146.2
7,487,615 B2 * 2/2009 Watanabe et al. ............ 49/441
(Continued)

FOREIGN PATENT DOCUMENTS

JP    55-147917 U    4/1954
JP    4-362417 A    12/1992
(Continued)

OTHER PUBLICATIONS

International Search Report issued Oct. 28, 2014, in PCT/IB2014/001188, filed Jun. 26, 2014.
(Continued)

*Primary Examiner* — Jerry Redman
(74) *Attorney, Agent, or Firm* — Oblon, McClelland, Maier & Neustadt, L.L.P.

(57) ABSTRACT

A vehicle press door structure includes: a door frame in which an open portion having a recess-shaped cross-section that is open to an inner peripheral side is formed by a door outer panel, and a door inner panel arranged on a vehicle width direction inside of the door outer panel; a door glass run that has lip portions that respectively extend toward a center side from both side portions of a door glass run main body having a recess-shaped cross-section and slidingly contact a door glass, the door glass run being fit into the open portion with a base portion between both of the side portions of the door glass nm main body opposing an inside wall of the door inner panel; and a seal portion that protrudes from the base portion and contacts the inside wall, and extends in a length direction of the door glass run main body.

5 Claims, 10 Drawing Sheets (58) Field of Classification Search
USPC .................................. 49/440, 441, 495.1
See application file for complete search history.

(56) References Cited

U.S. PATENT DOCUMENTS

| | | | |
|---|---|---|---|
| 7,648,188 B2* | 1/2010 | Yatsuda et al. | 296/146.2 |
| 8,104,229 B2* | 1/2012 | Minami et al. | 49/479.1 |
| 8,689,489 B2* | 4/2014 | Mine | 49/490.1 |
| 8,869,457 B2* | 10/2014 | Masumoto | 49/495.1 |
| 8,950,121 B2* | 2/2015 | Inaba et al. | 49/502 |
| 2001/0001917 A1* | 5/2001 | Goto | 49/440 |
| 2002/0184826 A1* | 12/2002 | Nozaki | 49/441 |
| 2005/0120633 A1* | 6/2005 | Takase et al. | 49/441 |
| 2005/0229496 A1* | 10/2005 | Tashima et al. | 49/441 |
| 2006/0021281 A1* | 2/2006 | Tamaoki et al. | 49/441 |
| 2007/0251152 A1* | 11/2007 | Takase et al. | 49/441 |
| 2011/0126473 A1 | 6/2011 | Prater et al. | |

FOREIGN PATENT DOCUMENTS

| | | |
|---|---|---|
| JP | 11-78537 A | 3/1999 |
| JP | 2000-103242 A | 4/2000 |
| JP | 2003-118383 A | 4/2003 |
| JP | 2005-263062 A | 9/2005 |
| JP | 2007-030729 A | 2/2007 |
| JP | 2007-145266 A | 6/2007 |
| JP | 2007-296898 A | 11/2007 |
| JP | 2008-024112 A | 2/2008 |
| JP | 2010-052461 A | 3/2010 |
| WO | WO 03/074308 A1 | 9/2003 |
| WO | WO 2011/129157 A1 | 10/2011 |

OTHER PUBLICATIONS

Written Opinion of the International Searching Authority issued Oct. 28, 2014, in PCT/IB2014/001188, filed Jun. 26, 2014.
Partial Translation of Japanese Office Action in JP 2013-135475 filed Jun. 27, 2013.

* cited by examiner

VEHICLE PRESS DOOR STRUCTURE AND DOOR GLASS RUN

BACKGROUND OF THE INVENTION

1. Field of the Invention

The invention relates to vehicle press door structure and a door glass run. More particularly, the invention relates to a vehicle press door structure in which a door glass run has been fit into a door frame, and the door glass run.

2. Description of Related Art

Japanese Patent Application Publication No. 2005-263062 (JP 2005-263062 A) describes a press door type door of a vehicle. A door frame of this door is formed by a door outer panel and a door inner panel. A door glass run is attached to an inner periphery of the door frame. The door glass run forms a seal between the door frame and a door glass when a window is closed.

The door frame is a channelless door frame in which a channel member having a recessed sectional shape that supports a base portion of a door glass run main body is not provided on an inner peripheral side. However, with this door frame, there is a space between the base portion of the door glass run main body and an inside wall of the door frame. As a result, there is room for improvement with respect to noise and water getting into the vehicle from outside the vehicle through this space in the door frame.

SUMMARY OF THE INVENTION

The invention thus provides a vehicle press door structure and a door glass run capable of improving sound insulation performance and watertight performance between a door frame and a door glass run.

A first aspect of the invention relates to a vehicle press door structure that includes a door frame in which an open portion having a recess-shaped cross-section that is open to an inner peripheral side is formed by a door outer panel, and a door inner panel arranged on a vehicle width direction inside of the door outer panel; a door glass run that has lip portions that respectively extend toward a center side from both side portions of a door glass run main body having a recess-shaped cross-section and slidingly contact a door glass, the door glass run being fit into the open portion with a base portion between both of the side portions of the door glass run main body opposing an inside wall of the door inner panel; and a seal portion that protrudes from the base portion and contacts the inside wall, and extends in a length direction of the door glass run main body.

In this aspect, the door frame is formed by the door outer panel and the door inner panel. The open portion having a recess-shaped cross-section that is open to the inner peripheral side is provided on this door frame. The door glass run is fit into the open portion. The door glass run has the lip portions that respectively extend toward the center side from both side portions of the door glass run main body having a recess-shaped cross-section and slidingly contact a door glass. The base portion of the door glass run main body opposes the inside wall of the door inner panel.

Here, the seal portion is provided on the door glass run. The seal portion protrudes from the base portion of the door glass run main body and contacts the inside wall of the door inner panel, and extends in a length direction of the door glass run main body. Therefore, between the inside wall of the door inner panel and the base portion of the door glass run main body is blocked off in the length direction of the door glass run main body by the seal portion. Accordingly, noise and water are effectively inhibited from getting into the vehicle from outside the vehicle, in the door frame.

The vehicle press door structure according to this aspect has a beneficial effect in which sound insulation performance and watertight performance between the door frame and the door glass run are able to be improved.

In the aspect described above, the seal portion may include a vehicle outside seal portion that protrudes from a vehicle width direction outside of the base portion, and a vehicle inside seal portion that protrudes farther from the vehicle width direction inside than the vehicle outside seal portion. The vehicle outside seal portion and the vehicle inside seal portion may have a shape in which a separation distance therebetween gradually becomes wider or narrower toward the inside wall.

According to this structure, the seal portion includes the vehicle outside seal portion and the vehicle inside seal portion. Therefore, between the inside wall of the door inner panel and the base portion of the door glass run main body is doubly blocked off from outside the vehicle toward the inside of the vehicle. Also, the vehicle outside seal portion and the vehicle inside seal portion of the seal portion are shaped such that the separation distance therebetween becomes wider or narrower toward the inside wall. Therefore, the vehicle outside seal portion and the vehicle inside seal portion contact the inside wall at an angle, and thus have a cushioning characteristic in which they will easily deform. As a result, the contact area between the inside wall and the vehicle outside seal portion and the vehicle inside seal portion is increased, and the airtightness of the contact portion is improved. Therefore, the sealing characteristic between the door frame and the door glass run is able to be improved even more.

With a vehicle press door structure having this structure, the sealing characteristic between the door frame and the door glass run is further improved, so sound insulation performance and watertight performance are able to be even further improved.

In the aspect described above, the door outer panel may include a vehicle outside engageable portion in which an end portion on the inner peripheral side of the door outer panel is bent toward the vehicle width direction inside. Also, a vehicle outside side portion of the door glass run main body, which is positioned on a vehicle width direction outside of both of the side portions of the door glass run main body, may include a vehicle outside engaging portion that engages with the vehicle outside engageable portion, and that fits the door glass run into the open portion.

According to this structure, the vehicle outside engageable portion is provided on the door outer panel, and the vehicle outside engaging portion is provided on the vehicle outside side portion of the door glass run main body. The door glass run is fit into the open portion by the vehicle outside engaging portion engaging with the vehicle outside engageable portion.

Here, the vehicle outside engageable portion is formed with the end portion on the inner peripheral side of the door outer panel bent toward the vehicle width direction inside, and the vehicle outside engaging portion is formed on the vehicle outside side portion of the door glass run main body that is fit into the open portion. Also, the door glass run is fit into the open portion by the vehicle outside engaging portion engaging with the vehicle outside engageable portion in the open portion. Therefore, there is no need for a vehicle outside molding portion that extends to the design surface of the door outer panel on the vehicle outside side portion of the door glass run main body. Thus, instead of the step between the vehicle outside molding portion and the door glass, there is a step between the door glass and the design surface of the door outer panel, so this step is reduced.

With the vehicle press door structure having this structure, the step to the door glass in the door frame is reduced, so wind disturbance around the door frame is effectively suppressed. As a result, wind noise and air resistance are able to be reduced.

In the structure described above, a bent extended portion in which the door inner panel curves and extends toward the inner peripheral side may be provided on an edge portion of the door inner panel on the vehicle width direction inside, which opposes the base portion. Also, the bent extended portion, the inside wall, and an inside wall of the door outer panel may form a housing and retaining portion that at least houses the base portion, and retains the door glass run main body by pushing the door glass run main body against the inside wall of the door outer panel.

According to this structure, the bent extended portion in which the door inner panel curves and extends toward the inner peripheral side is provided on an edge portion of the door inner panel on the vehicle width direction inside, which opposes the base portion. This bent extended portion, together with the inside wall of the door inner panel, and the inside wall of the door outer panel, forms the housing and retaining portion. Here, in the housing and retaining portion, at least the base portion of the door glass run main body is housed, and the door glass run main body is retained pressed against the inside wall of the door outer panel. Therefore, the fitting position and orientation of the door glass run are determined with the housing and retaining portion as a reference, and the door glass run is retained in this determined fitting position and orientation.

The vehicle press door structure having this structure is provided with the housing and retaining portion, and thus has a beneficial effect in which the posture retaining force of the door glass run in the door frame is able to be improved.

In the structure described above, the vehicle outside seal portion and the vehicle inside seal portion may have a shape in which a separation distance therebetween gradually becomes wider toward the inside wall, and a tip end in a protruding direction of the vehicle inside seal portion may be elastically pressed against the bent extended portion.

According to this structure, the vehicle outside seal portion and the vehicle inside seal portion are shaped such that the separation distance between them gradually increases toward the inside wall. Here, the tip end in the protruding direction of the vehicle inside seal portion of the seal portion elastically pressed against the bent extended portion. Therefore, the door glass run main body is pressed toward the inside wall of the door outer panel via the vehicle inside seal portion by the bent extended portion, so fitting position and orientation of the door glass run are determined with the inside wall of the door outer panel as a reference, and the door glass run is retained in this determined fitting position and orientation.

The vehicle press door structure having this structure is provided with the bent extended portion and the vehicle inside seal portion, the tip end in the protruding direction of which is positioned against the bent extended portion, so the posture retaining force of the door glass run in the door frame is able to be improved.

In the structure described above, a portion on the vehicle width direction inside of the door inner panel may be formed with a U-shaped cross-section that is open on the open portion side and protrudes toward the vehicle width direction inside, and an inside wall of an edge portion on the open portion side of the door inner panel may be a vehicle inside engageable portion. Also, a vehicle inside engaging portion that is engaged with the vehicle inside engageable portion and fits the door glass run into the open portion may be provided on an end portion on a side opposite the base portion, of a vehicle inside side portion that is positioned on the vehicle width direction inside of both of the side portions of the door glass run main body.

According to this structure, the vehicle inside engageable portion is provided on the door inner panel, and the vehicle inside engaging portion is provided on the vehicle inside side portion of the door glass run main body. The door glass run is fit into the open portion by the vehicle inside engaging portion engaging with the vehicle inside engageable portion.

Here, the portion of the door inner panel on the vehicle width direction inside is formed having a U-shaped cross-section that is open on the open portion side and protrudes toward the vehicle width direction inside. Also, the vehicle inside engageable portion is the inside wall of the edge portion on the open portion side of the door inner panel. Meanwhile, the vehicle inside engaging portion is provided on the end portion of the vehicle inside side portion of the door glass run main body. Also, the door glass run is fit into the open portion by the vehicle inside engaging portion engaging with the vehicle inside engageable portion inside the open portion. Therefore, there is no need for the vehicle inside molding portion for fitting the door glass run and that extends toward the design surface of the door inner panel on the vehicle inside side portion of the door glass run main body, or the protruding amount of the vehicle inside molding portion toward the design surface is reduced.

The vehicle press door structure having this structure has a beneficial effect in which the sectional shape of the door frame is able to be made compact.

A second aspect of the invention relates to a door glass run. This door glass run includes i) a door glass run main body that is fit into the open portion of the door frame according to the aspect described above, and that has lip portion that respectively extend toward a center side from both side portions having a recess-shaped cross-section and slidingly contact the door glass, and also has a base portion between both of the side portions; and ii) a seal portion that protrudes from the base portion and contacts an inside wall of the door inner panel, and extends in a length direction of the door glass run main body.

This aspect is able to display the same operation as that obtained by the vehicle press door structure described above.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Example Embodiment

A vehicle press door structure according to a first example embodiment of the invention will now be described with reference to FIGS. 1 to 7. In the drawings, arrow FR indicates a vehicle forward side, and arrow UP indicates a vehicle upward side. Also, arrow IN indicates a vehicle width direction inside, i.e., a vehicle cabin inside.

(General Structure of Vehicle)

Figure 1:
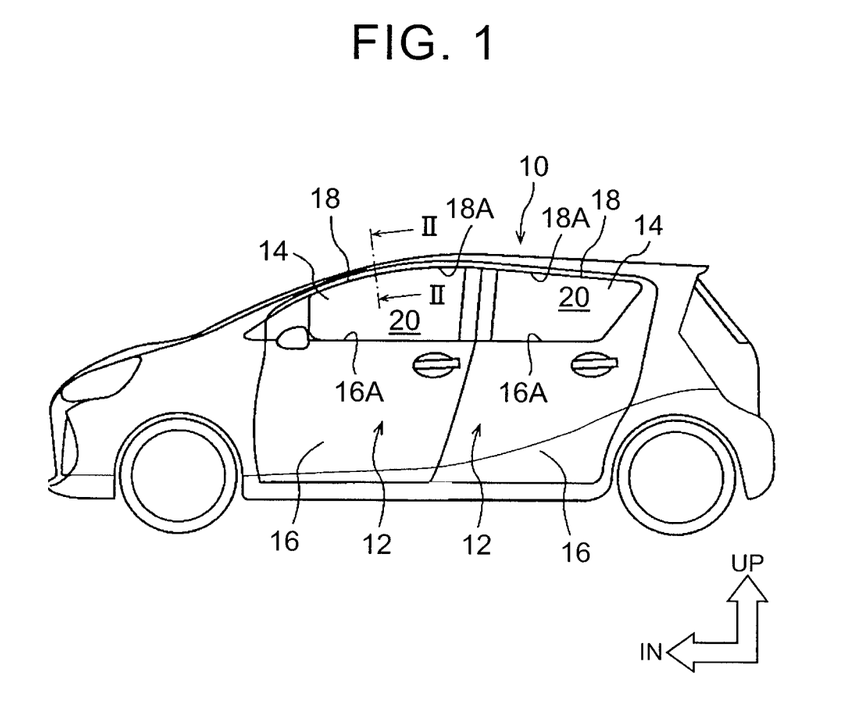
FIG. 1 is a side view of a vehicle to which a vehicle press door structure according to a first example embodiment of the invention has been applied.

As shown in FIG. 1, a vehicle 10 to which a vehicle press door structure according to this example embodiment has been applied is a four-door type vehicle, and includes a side door 12. The side door 12 includes a door main body 16 that forms a vehicle body side portion and in which is housed a window regulator and the like, not shown, that raises and lowers a door glass 14, and a door frame 18 provided on an upper portion of this door main body 16. A window opening 20 is formed surrounded by an upper edge (door belt molding) 16A of the door main body 16 and an inner peripheral edge 18A of the door frame 18. The window opening 20 is able to open and close by raising and lowering of the door glass 14.

(Structure of the Door Frame)

Figure 2:
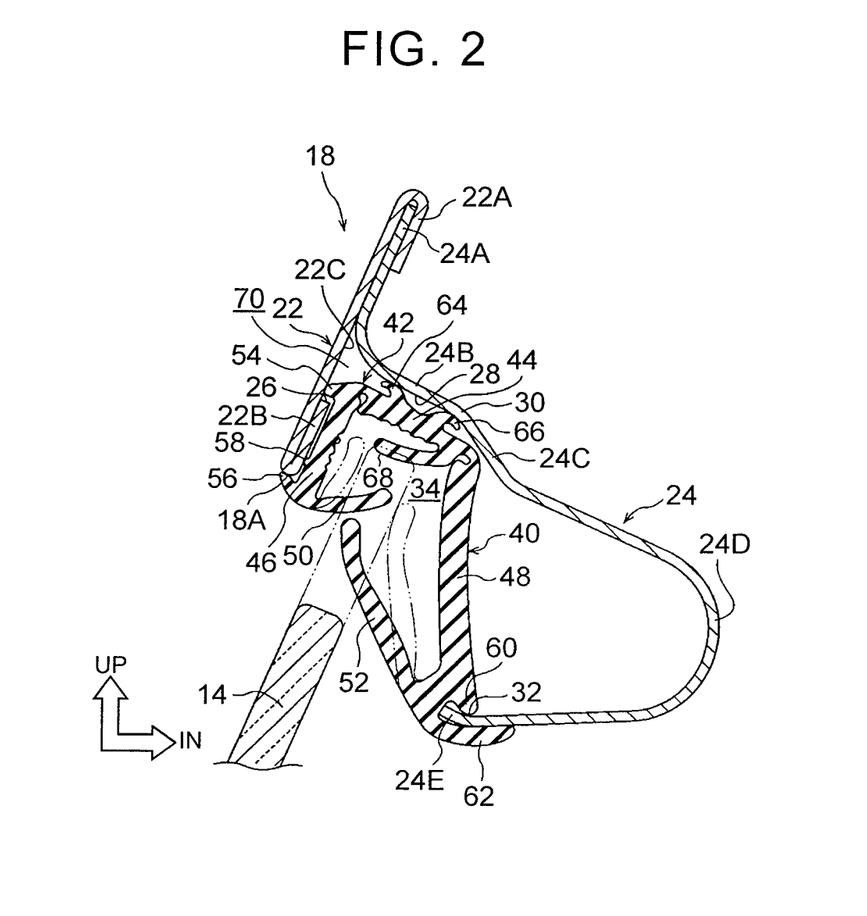
FIG. 2 is an enlarged sectional view of a side door of the vehicle taken along line II-II in FIG. 1, viewed from the direction indicated by the arrows.

As shown in FIG. 2, the door frame 18 includes a plate-shaped door outer panel 22 that extends with a direction along a peripheral edge of the window opening 20 as the length direction, and of which a vehicle outside surface is a design surface, and a door inner panel 24 that is arranged on a vehicle width direction inside of this door outer panel 22, and of which a vehicle inside surface is a design surface. An open portion 34 having a recessed cross-section that opens to an inner peripheral side (i.e., the inner peripheral edge 18A side) is formed in this door frame 18. A door glass run 40 is fit into this open portion 34.

Figure 4:
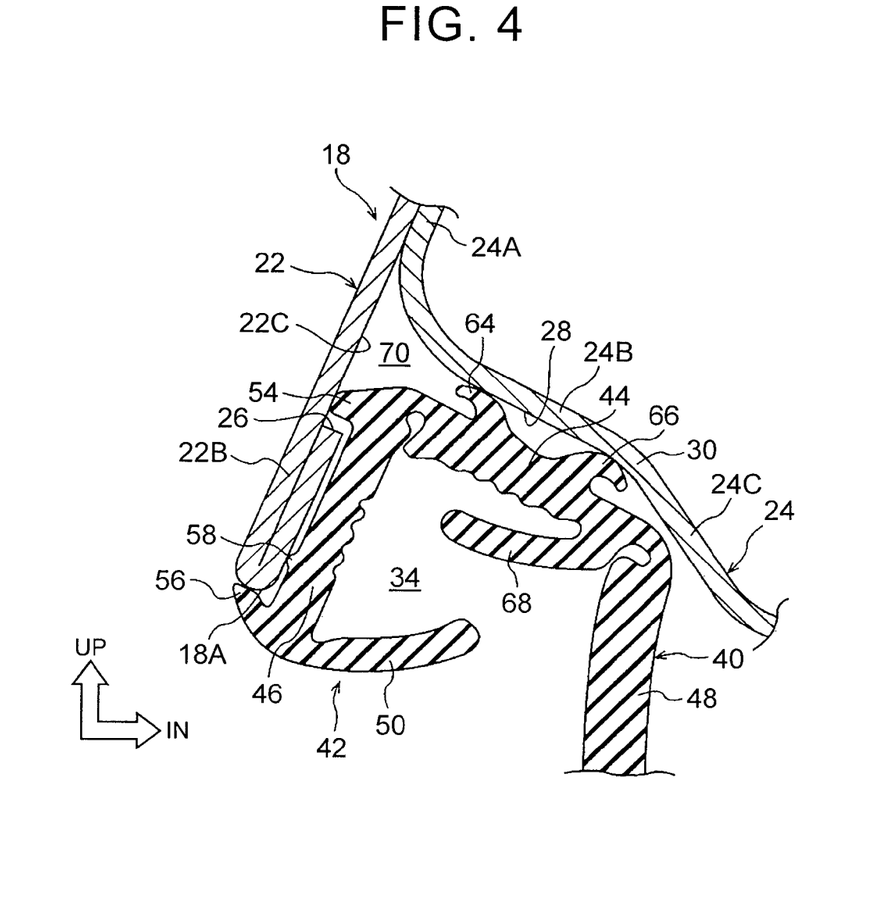
FIG. 4 is an enlarged sectional view showing a state in which the door glass run shown in FIG. 3 is fit into a door frame, viewed from the same direction.
Figure 5:
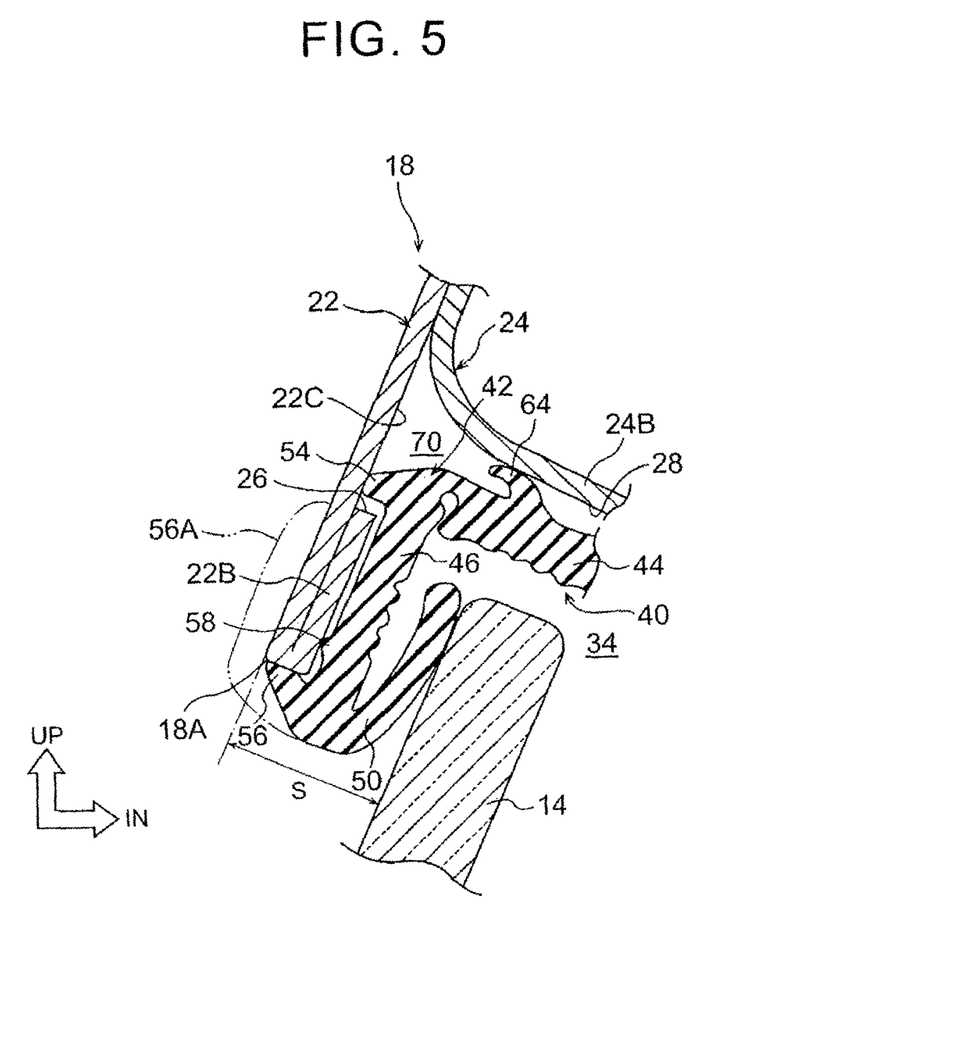
FIG. 5 is an enlarged sectional view of the main portions on a vehicle width direction outside, of the door frame and the door glass run shown in FIG. 2, viewed from the same direction.

As shown in FIGS. 2, 4, and 5, an outer peripheral end portion 22A of the door outer panel 22 is joined to an outer peripheral end portion 24A of the door inner panel 24 by seaming. An inner peripheral end portion 22B of the door outer panel 22 that will be the inner peripheral side of the door frame 18 (i.e., the inner peripheral edge 18A side) is folded back toward the vehicle width direction inside by hemming. This bent terminal portion is a vehicle outside engageable portion 26.

Figure 6:
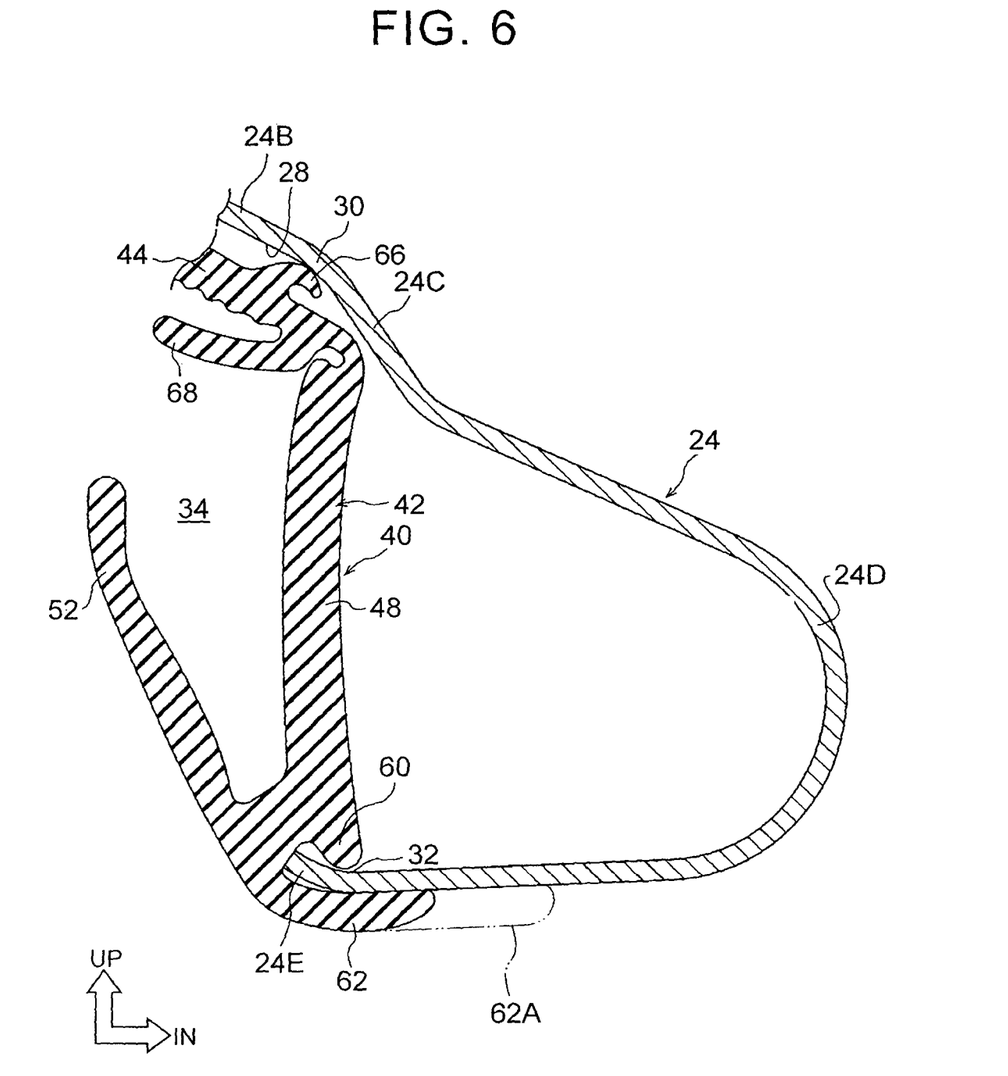
FIG. 6 is an enlarged sectional view of the main portions on a vehicle width direction inside, of the door frame and the door glass run shown in FIG. 2, viewed from the same direction.

As shown in FIGS. 2, 4, and 6, the outer peripheral end portion 24A of the door inner panel 24 extends contacting an inside wall 22C of the door outer panel 22 until an intermediate portion of the outer peripheral end portion 22A and the inner peripheral end portion 22B of the door outer panel 22. The door inner panel 24 includes this outer peripheral end portion 24A, a lateral wall 24B in which an inner peripheral side end of the door frame 18 of the outer peripheral end portion 24A is folded back toward the vehicle width direction inside, an inclined wall 24C in which a vehicle width direction inside end (edge portion) of the lateral wall 24B extends curved toward the inner peripheral side, and a doubled-back wall 24D that has a U-shaped cross section, and that is provided protruding toward the vehicle width direction inside from an inner peripheral side end of the inclined wall 24C, with the open portion 34 side open. Also, an edge portion 24E on the open portion 34 side of the doubled-back wall 24D bent back slightly toward the outer peripheral side of the door frame 18, and an inside wall of the edge portion 24E that opposes an inside wall 28 of the lateral wall 24B is a vehicle inside engageable portion 32.

As shown in FIGS. 2 and 4, the inside wall 28 of the lateral wall 24B of the door inner panel 24 is a bottom wall of the open portion 34. This inside wall 28 opposes a back surface of a base portion 44 of the door glass run 40. Between the lateral wall 24B and the inclined wall 24C is a bent extended portion 30 having an inverted V-shaped cross-section. In this example embodiment, a housing and retaining portion 70 that has an inverted L-shaped cross-section, houses at least the base portion 44 of the door glass run 40, and retains a door glass run main body 42 by pushing it (i.e., the door glass run main body 42) against the door outer panel 22, is formed inside the open portion 34 by the inside wall 28 of the door inner panel 24, the bent extended portion 30, and the base portion 44 of the door glass run 40.

(Structure of the Door Glass Run)

The door glass run 40 includes the door glass run main body 42 that is formed extending in the length direction of the door frame 18 shown in FIG. 1, and has a recess-shaped cross-section that is open to the inner peripheral side of the door frame 18 as shown in FIGS. 2 to 6. This door glass run main body 42 includes as main constituent elements the base portion 44, a vehicle outside side portion 46 and a vehicle inside side portion 48 as both side portions, and a vehicle outside lip portion 50 and a vehicle inside lip portion 52 as lip portions. The base portion 44 is a portion that corresponds to a bottom portion of the door glass run main body 42, which has a recess-shaped cross-section, and opposes the inside wall 28 of the lateral wall 24B of the door inner panel 24 at a slight distance. The one vehicle outside side portion 46 is provided protruding toward the inner peripheral side from the end portion of the base portion 44 on the vehicle width direction outside, and is integrally formed with the base portion 44. The other vehicle inside side portion 48 is also provided protruding toward the inner peripheral side from the end portion, substantially parallel to the vehicle outside side portion 46 of the base portion 44, in a position farther toward the vehicle width direction inside than the vehicle outside side portion 46, and is also integrally formed with the base portion 44. The vehicle outside lip portion 50 and the vehicle inside lip portion 52 each extend toward the center side from both side portions, i.e., the vehicle outside side portion 46 and the vehicle inside side portion 48, and slidingly contact the door glass 14. The vehicle outside lip portion 50 is integrally formed with the inner peripheral side end of the vehicle outside side portion 46. Also, the vehicle inside lip portion 52 is integrally formed with the inner peripheral side end of the vehicle inside side portion 48. The door glass run 40 is manufactured by extrusion molding rubber material.

Figure 3:
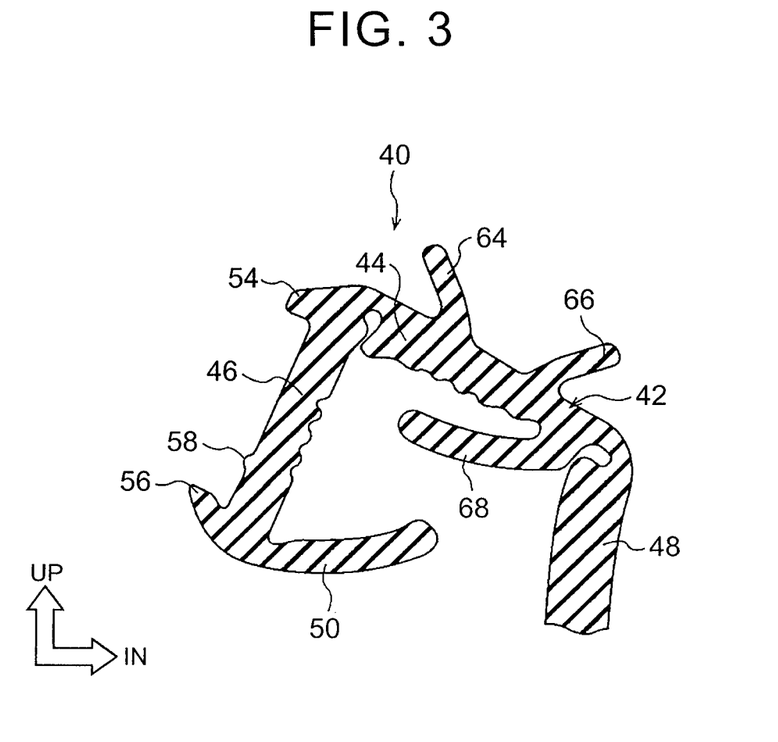
FIG. 3 is an enlarged sectional view of the main portions on a vehicle upper side, of a door glass run shown in FIG. 2, viewed from the same direction.

As shown in FIGS. 2 to 4, the door glass run main body 42 is provided with a vehicle outside seal portion 64 and a vehicle inside seal portion 66 as seal portions that protrude from the base portion 44 and contact the inside wall 28, and extend in the length direction of the door glass run main body 42. The vehicle outside seal portion 64 is integrally formed with the base portion 44, and protrudes toward the inside wall 28 from the vehicle width direction outside of this base portion 44. The vehicle inside seal portion 66 is similarly integrally formed with the base portion 44, and protrudes toward the inside wall 28 from farther on the vehicle width direction inside than the vehicle outside seal portion 64 of this base portion 44. In this example embodiment, the vehicle outside seal portion 64 and the vehicle inside seal portion 66 are shaped such that the separation distance therebetween gradually becomes wider toward the inside wall 28. In particular, as shown in FIG. 4, when the door glass run 40 is fit into the open portion 34 of the door frame 18, the vehicle outside seal portion 64 and the vehicle inside seal portion 66 contact the inside wall 28 and elastically deform so as to be in tight contact with the inside wall 28 (i.e., are elastically pressed against the inside wall 28). Also, a tip end portion in the protruding direction of the vehicle inside seal portion 66 contacts the bent extended portion 30 between the lateral wall 24B and the inclined wall 24C of the housing and retaining portion 70. At this bent extended portion 30, movement of the tip end portion in the protruding direction of the vehicle inside seal portion 66 toward the vehicle width direction inside is restricted, such that reaction force against the elastic deformation is generated in the vehicle inside seal portion 66. This reaction force acts to push the door glass run main body 42 against the inside wall 22C of the door outer panel 22 via the vehicle inside seal portion 66.

As shown in FIGS. 2 to 5, a vehicle outside engaging portion 54 that protrudes toward the inside wall 22C side of the door outer panel 22 and is engaged with the vehicle outside engageable portion 26, is integrally formed on the end portion of the vehicle outside side portion 46 that is on the base portion 44 side. The vehicle outside engaging portion 54 is set to at least the same protruding amount as the dimensions of the vehicle outside engageable portion 26 (which corresponds to the plate thickness of the door outer panel 22). Also, in other words, the vehicle outside engaging portion 54 is formed by recessing the vehicle outside side portion 46 to match the folded back position of the inner peripheral end portion 22B of the door outer panel 22 that been hemmed. When the vehicle outside engaging portion 54 is engaged with the vehicle outside engageable portion 26, the door glass run 40 is inhibited from slipping out of the open portion 34, and the door glass run 40 is able to be fit into the open portion 34. Meanwhile, a vehicle outside retaining portion 56 that protrudes out toward the door outer panel 22 side and engages with the inner peripheral edge 18A of the inner peripheral end portion 22B, is integrally formed on an end portion of the vehicle outside side portion 46 that is on the side opposite the vehicle outside engaging portion 54. The vehicle outside retaining portion 56 is configured to retain (i.e., grip) the inner peripheral edge 18A so that the vehicle outside side portion 46 will stay on the door outer panel 22 even if the door glass 14 shown in FIGS. 2 and 5 pushes the vehicle outside lip portion 50 up when the window is closed. Also, a protrusion 58 that regulates the distance between the vehicle outside side portion 46 and the inner peripheral end portion 22B is integrally formed on the inner peripheral end portion 22B side of the vehicle outside side portion 46, at an intermediate portion between the vehicle outside engaging portion 54 and the vehicle outside retaining portion 56.

As shown in FIGS. 2 and 6, a vehicle inside engaging portion 60 that protrudes toward an inside wall side of the edge portion 24E of the door inner panel 24 and engages with the vehicle inside engageable portion 32 is integrally formed with an end portion of the vehicle inside side portion 48 that is on the side opposite the base portion 44, i.e., on the tip end portion in the protruding direction. When the vehicle inside engaging portion 60 engages with the vehicle inside engageable portion 32, the vehicle inside side portion 48 bows between the inclined wall 24C and the edge portion 24E in the open portion 34, thus inhibiting the door glass run 40 from coming out of the open portion 34, and enabling the door glass run 40 to be fit into the open portion 34. Meanwhile, the end portion of the vehicle inside side portion 48 branches off from a base position of the vehicle inside engaging portion 60, and the vehicle inside lip portion 52 and a vehicle inside retaining portion 62 are integrally formed on this base portion. The vehicle inside retaining portion 62 extends a certain amount on the design surface on the vehicle cabin inside of the edge portion 24E of the door inner panel 24 that will be the back surface side of the vehicle inside engageable portion 32, and just sandwiches (holds tightly) the edge portion 24E with the vehicle inside engaging portion 60. Similar to the vehicle outside retaining portion 56, the vehicle inside retaining portion 62 retains the vehicle inside side portion 48 so that it will stay on the door inner panel 24 even if the door glass 14 pushes the vehicle inside lip portion 52 up when the window is closed.

As shown in FIGS. 2 to 4 and FIG. 6, a door glass end seal portion 68 that protrudes toward the center side of the vehicle outside side portion 46 and the vehicle inside side portion 48 is integrally formed on a joining portion of the base portion 44 and the vehicle inside side portion 48. When the window is closed, the door glass end seal portion 68 contacts the end portion of the door glass 14 and elastically deforms, and is thus in tight contact, with the door glass 14.

(Operation and Effect of this Example Embodiment)

With the vehicle press door structure according to this example embodiment, the door frame 18 shown in FIGS. 1 and 2 is formed by the door outer panel 22 and the door inner panel 24. The open portion 34 having a recessed cross-section that opens to the inner peripheral side (i.e., the inner peripheral edge 18A side), as shown in FIG. 2 in particular, is provided on this door frame 18. The door glass run 40 is fit into the open portion 34. The door glass run 40 has the vehicle outside lip portion 50 and the vehicle inside lip portion 52, both of which extend toward the center side from both side portions (i.e., the vehicle outside side portion 46 and the vehicle inside side portion 48) of the door glass run main body 42 that has a recessed cross-section, and that slidingly contact the door glass 14. The base portion 44 opposes the inside wall 28 of the door inner panel 24.

Here, the vehicle outside seal portion 64 and the vehicle inside seal portion 66 as seal portions are provided on the door glass run 40, as shown in FIGS. 2 to 6. The vehicle outside seal portion 64 and the vehicle inside seal portion 66 protrude from the base portion 44 of the door glass run main body 42, and contact the inside wall 28 of the inside wall 28, while extending in the length direction of the door glass run main body 42. Therefore, between the inside wall 28 of the door inner panel 24 and the base portion 44 of the door glass run main body 42 is blocked off in the length direction of the door glass run main body 42 by the vehicle outside seal portion 64 and the vehicle inside seal portion 66 (see FIGS. 2 and 4 in particular). Accordingly, noise and water are effectively inhibited from getting into the vehicle from outside the vehicle, in the door frame 18.

Figure 7:
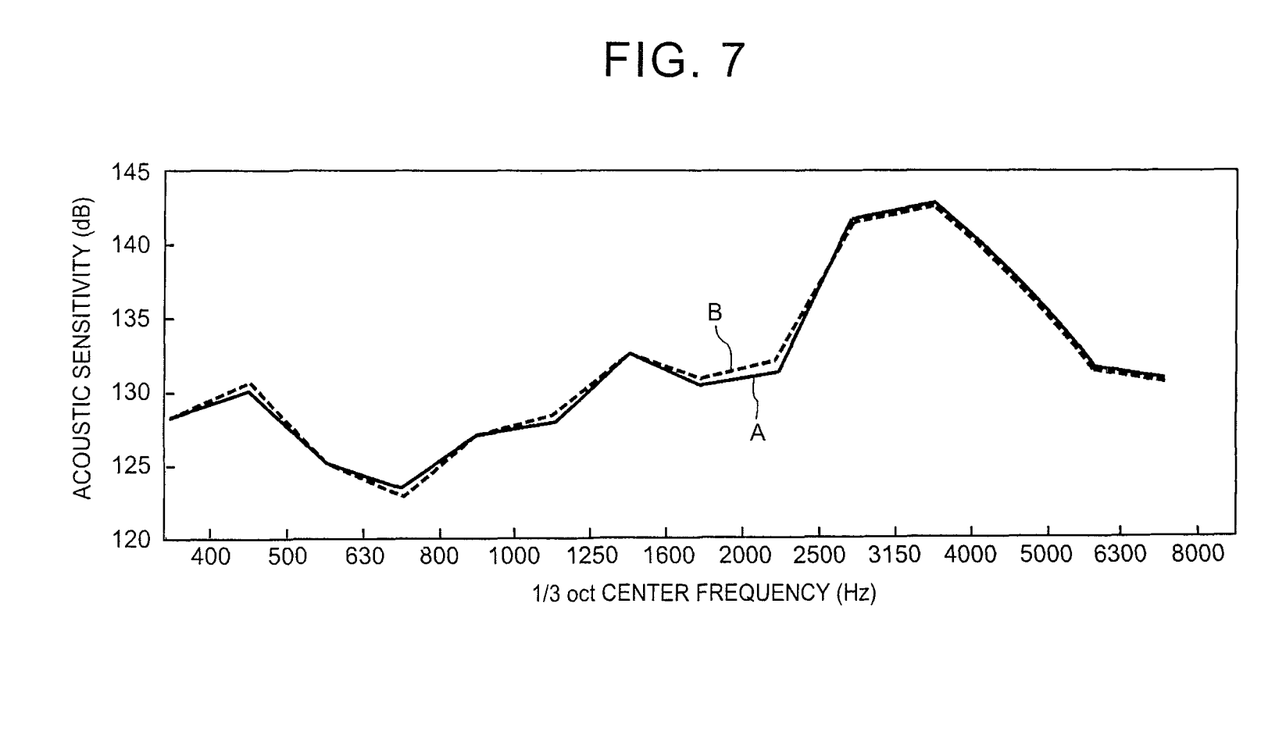
FIG. 7 is a diagram showing the relationship between acoustic sensitivity and ⅓ octave center frequency of a side door to which the vehicle press door structure according to the first example embodiment of the invention has been applied.

FIG. 7 is a diagram illustrating the relationship between acoustic sensitivity (dB) and ⅓ octave center frequency (Hz) to illustrate sound insulation performance. In FIG. 7, actually measured data A shown by the solid line is the result from measuring noise generated from outside a vehicle in the vehicle, for the door frame 18 to which the vehicle press door structure according to this example embodiment has been applied. Also, actually measured data B is the measurement result of a case in which the vehicle press door structure according to the example embodiment is not applied. With the measurements here, the results show that noise penetration within a range up to 2500 Hz is significantly reduced.

Therefore, with the vehicle press door structure according to this example embodiment, sound insulation performance and watertight performance between the door frame 18 and the door glass run 40 are able to be improved.

Also, as shown in FIGS. 2, 4, 5, and 6, with the vehicle press door structure according to this example embodiment, when the door glass 14 is closed, the raising/lower force (pressure) of the door glass 14 is received, via the base portion 44 of the door glass run main body 42, the vehicle outside seal portion 64, and the vehicle inside seal portion 66, by the inside wall 28 of the door inner panel 24 that is more rigid (harder) than these. Therefore, deformation of the door glass run 40 that will cause it to come out of the open portion 34 is inhibited. More specifically, the vehicle outside retaining portion 56 is inhibited from coming off of the inner peripheral end portion 22B, and the vehicle inside retaining portion 62 is inhibited from coming off of the edge portion 24E. Therefore, the door glass run 40 is stably retained in the open portion 34 of the door frame 18.

Moreover, with the vehicle press door structure according to this example embodiment, when the door glass 14 is closed, the raising/lower force (pressure) of the door glass 14 is used as seal pressure that presses the vehicle outside seal portion 64 and the vehicle inside seal portion 66 against the inside wall 28 of the door inner panel 24. Therefore, airtightness between the inside wall 28 and the vehicle outside seal portion 64 and the vehicle inside seal portion 66 is improved, and the seal area between the inside wall 28 and the vehicle outside seal portion 64 and the vehicle inside seal portion 66 increases with elastic deformation of the vehicle outside seal portion 64 and the vehicle inside seal portion 66. Therefore, the sealing characteristic between the door frame 18 and the door glass run 40 is able to improved even more.

Also, as shown in FIGS. 2 and 6, with the vehicle press door structure according to this example embodiment, the distance between the base portion 44 of the door glass run main body 42 and the inside wall 28 of the door inner panel 24 is reduced enough so that the vehicle outside seal portion 64 and the vehicle inside seal portion 66 contact the inside wall 28. Therefore, the space between the back surface of the door glass run 40 and the door frame 18 is reduced, so the sectional shape of the door frame 18 is able to be made compact. Also, because the sectional shape of the door frame 18 is compact, the appearance of the vehicle 10 is nicer, and the appearance design of the door frame 18 is improved.

Moreover, with the vehicle press door structure according to this example embodiment, as shown in FIGS. 2 to 4, the seal portion includes the vehicle outside seal portion 64 and the vehicle inside seal portion 66. Therefore, between the inside wall 28 of the door inner panel 24 and the base portion 44 of the door glass run main body 42 is doubly blocked off from the vehicle width direction outside toward the inside. Also, the vehicle outside seal portion 64 and the vehicle inside seal portion 66 of the seal portion are shaped such that the separation distance therebetween becomes wider toward the inside wall 28. Therefore, the vehicle outside seal portion 64 and the vehicle inside seal portion 66 contact the inside wall 28 at an angle, and thus have a cushioning characteristic in which they will easily deform. As a result, the contact area between the inside wall 28 and the vehicle outside seal portion 64 and the vehicle inside seal portion 66 is increased, and the airtightness of the contact portion is improved. Therefore, the sealing characteristic between the door frame 18 and the door glass run 40 is able to be improved even more.

In this way, with the vehicle press door structure according to this example embodiment, the sealing characteristic between the door frame 18 and the door glass run 40 is further improved, so sound insulation performance and watertight performance are able to be even further improved.

Also, with the vehicle press door structure according to the example embodiment, as shown in FIGS. 2 to 5, the vehicle outside engageable portion 26 is provided on the door outer panel 22, and the vehicle outside engaging portion 54 is provided on the vehicle outside side portion 46 of the door glass run main body 42. Also, the door glass run 40 is fit into the open portion 34 by the vehicle outside engaging portion 54 engaging with the vehicle outside engageable portion 26.

Here, the vehicle outside engageable portion 26 is formed with the inner peripheral end portion 22B of the door outer panel 22 bent toward the vehicle width direction inside, and the vehicle outside engaging portion 54 is formed on the vehicle outside side portion 46 of the door glass run main body 42 that is fit into the open portion 34. Also, the door glass run 40 is fit into the open portion 34 by the vehicle outside engaging portion 54 being engaged with the vehicle outside engageable portion 26 in the open portion 34. Therefore, there is no need for a vehicle outside molding portion 56A that extends to the design surface of the door outer panel 22 on the vehicle outside side portion 46 of the door glass run main body 42, the outline of which is shown by the chain double-dashed line in FIG. 5. Thus, instead of the step between the vehicle outside molding portion 56A and the door glass 14, there is a step S between the door glass 14 and the design surface of the door outer panel 22, so this step S is reduced.

Therefore, with the vehicle press door structure according to this example embodiment, the step S to the door glass 14 of the door frame 18 is reduced, so wind disturbance around the door frame 18 is effectively suppressed. As a result, wind noise and air resistance are able to be reduced.

Also, with the vehicle press door structure according to this example embodiment, there is no need for the vehicle outside molding portion 56A shown in FIG. 5 on the door glass run 40, so the structure of the door glass run 40 is able to be simplified.

Moreover, because there is no need for the vehicle outside molding portion 56A on the door glass run 40, the width dimension (i.e., the dimension in the short direction) of the door outer panel 22 is reduced by an amount corresponding to the amount held onto by the vehicle outside molding portion 56A. Therefore, the distance between the base portion 44 of the door glass run main body 42 and the inside wall 28 of the door outer panel 22 is reduced enough so that the vehicle outside seal portion 64 and the vehicle inside seal portion 66 contact the inside wall 28. Therefore, the space between the back surface of the door glass run 40 and the door frame 18 is reduced, so the sectional shape of the door frame 18 is able to be made compact. Also, the width dimension of the door outer panel 22 is reduced, so the appearance of the vehicle 10 is nicer, and the appearance design of the door frame 18 is improved.

Also, the design surface of the door outer panel 22 of the door frame 18 is not covered by the vehicle outside molding portion 56A, so from this perspective as well, the appearance of the vehicle is nicer, and the appearance design of the door frame 18 is able to be improved. Furthermore, the step S between the design surface of the door outer panel 22 and the door glass 14 is smaller, so from this perspective as well, the appearance of the vehicle is nicer, and the appearance design of the side door 12 is able to be improved.

Moreover, with the vehicle press door structure according to this example embodiment, the bent extended portion 30 in which the door inner panel 24 curves and extends toward the inner peripheral side is provided on an edge portion (a boundary location between the lateral wall 24B and the inclined wall 24C) of the door inner panel 24 on the vehicle width direction inside opposing the base portion 44, as shown in FIGS. 2 and 4. This bent extended portion 30, the inside wall 28 of the door inner panel 24, and the inside wall 22C of the door outer panel 22 are formed as the housing and retaining portion 70. Here, in the housing and retaining portion 70, at least the base portion 44 of the door-glass run main body 42 is housed, and the door glass run main body 42 is retained pressed against the inside wall 22C of the door outer panel 22. Therefore, the fitting position and orientation of the door glass run 40 are determined with the housing and retaining portion 70 as a reference, and the door glass run 40 is retained in this determined fitting position and orientation.

Accordingly, with the vehicle press door structure according to this example embodiment, the housing and retaining portion 70 is provided, so the posture retaining force of the door glass run 40 in the door frame 18 is able to be improved.

Also, with the vehicle press door structure according to this example embodiment, the vehicle outside seal portion 64 and the vehicle inside seal portion 66 are shaped such that the separation distance between them gradually increases toward the inside wall 28. Here, the tip end in the protruding direction of the vehicle inside seal portion 66 of the seal portion elastically pressed against the bent extended portion 30. Therefore, the door glass run main body 42 is pressed toward the inside wall 22C of the door outer panel 22 via the vehicle inside seal portion 66 by the bent extended portion 30, so fitting position and orientation of the door glass run 40 are determined with the inside wall 22C of the door outer panel 22 as a reference, and the door glass run 40 is retained in this determined fitting position and orientation.

Therefore, the vehicle press door structure according to this example embodiment is provided with the bent extended portion 30 and the vehicle inside seal portion 66, the tip end in the protruding direction of which is positioned against the bent extended portion 30, so the posture retaining force of the door glass run 40 in the door frame 18 is able to be improved.

Furthermore, with the vehicle press door structure according to this example embodiment, the vehicle inside engageable portion 32 is provided on the door inner panel 24, and the vehicle inside engaging portion 60 is provided on the vehicle inside side portion 48 of the door glass run main body 42, as shown in FIGS. 2 and 6. Also, the door glass run 40 is fit into the open portion 34 by the vehicle inside engaging portion 60 engaging with the vehicle inside engageable portion 32.

Here, the portion of the door inner panel 24 on the vehicle width direction inside is formed as the doubled-back wall 24D having a U-shaped cross-section that is open on the open portion 34 side and protrudes toward the vehicle width direction inside. Also, the vehicle inside engageable portion 32 is the inside wall of the edge portion 24E on the open portion 34 side of the door inner panel 24. Meanwhile, the vehicle inside engaging portion 60 is provided on the end portion of the vehicle inside side portion 48 of the door glass run main body 42. Also, the door glass run 40 is fit into the open portion 34 by the vehicle inside engaging portion 60 engaging with the vehicle inside engageable portion 32 inside the open portion 34. Therefore, there is no need for the vehicle inside molding portion 62A that extends from the vehicle inside side portion 48 of the door glass run main body 42 toward the design surface of the door inner panel 24, the outline of which is shown by the chain double-dashed line in FIG. 6. In this example embodiment, the vehicle inside retaining portion 62 that does not protrude as far toward the design surface is provided, so the protruding amount of the vehicle inside retaining portion 62 toward the design surface is less with respect to the amount holding onto the door inner panel 24 when the vehicle inside molding portion 62A is formed.

Therefore, with the vehicle press door structure according to this example embodiment, the sectional shape of the door inner panel 24 is able to be made compact. Also, because the sectional shape of the door inner panel 24 is compact, visibility from inside the vehicle cabin to the vehicle cabin is improved. Moreover, the door glass run 40 is fit into the open portion 34 by the vehicle inside retaining portion 62 that protrudes less toward the design surface of the door inner panel 24, so the appearance of the design surface inside the vehicle cabin is better, and thus the interior design is able to be enhanced.

Also, the door glass run 40 according to this example embodiment is able to obtain the same operation and effects as those obtained by the vehicle press door structure described above when fit into the open portion 34 of the door frame 18.

Modified Example of Door Glass Run

Figure 8:
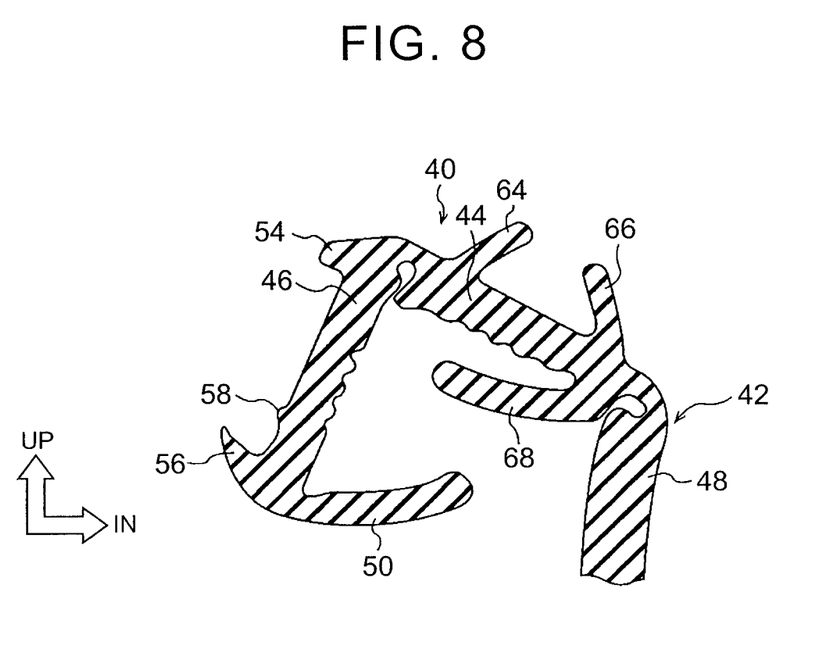
FIG. 8 is an enlarged sectional view corresponding to FIG. 3, of a door glass run to which the vehicle press door structure according to the first example embodiment of the invention has been applied.

With the door glass run 40 used in the vehicle press door structure according to a modified example the first example embodiment, the vehicle outside seal portion 64 and the vehicle inside seal portion 66 are shaped such that the separation distance between them gradually becomes narrower toward the inside wall 28 of the door inner panel 24, as shown in FIG. 8. According to this door glass run 40, the vehicle outside seal portion 64 and the vehicle inside seal portion 66 contact the inside wall 28 of the door inner panel 24 at an angle, and thus have a cushioning characteristic in which they will easily deform, similar to the door glass run 40 in the first example embodiment described above. Therefore, the sealing characteristic between the inside wall 28 and the door glass run 40 is able to be improved even more.

Second Example Embodiment

Next, a vehicle press door structure according to a second example embodiment of the invention will be described with reference to FIGS. 9 and 10. In this second example embodiment, constituent elements having the same or equivalent functions as the constituent elements described with the vehicle press door structure according to the first example embodiment will be denoted by like reference characters, and redundant descriptions will be omitted.

(Structure of the Door Frame)

Figure 9:
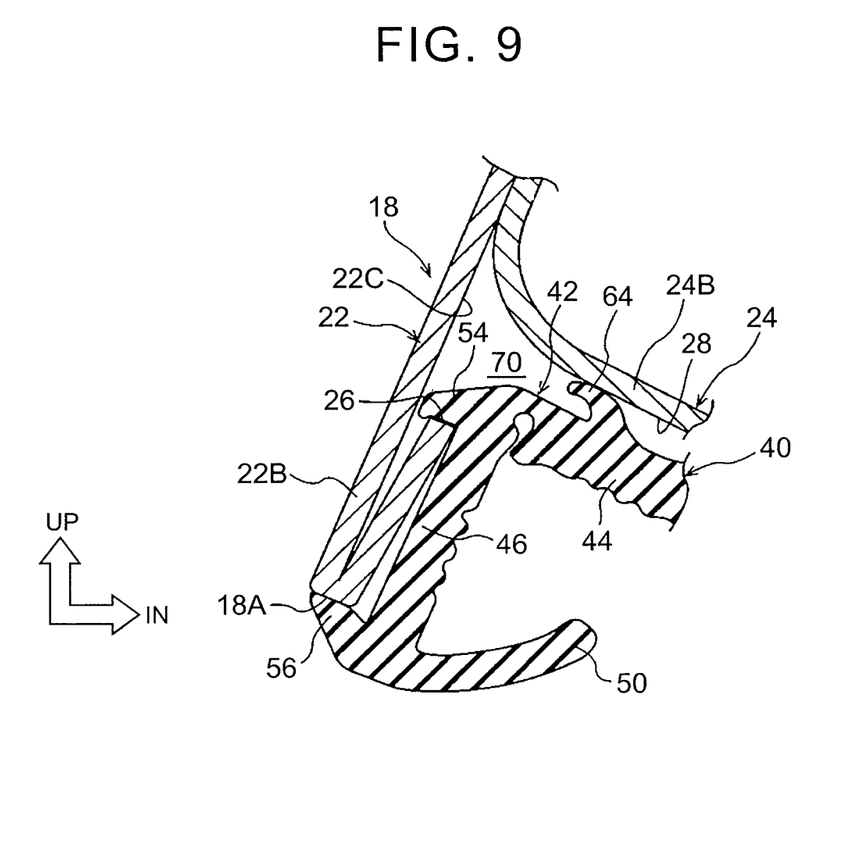
FIG. 9 is an enlarged sectional view corresponding to FIG. 5 of a door frame and a door glass run to which a vehicle press door structure according to a second example embodiment of the invention has been applied.
Figure 10:
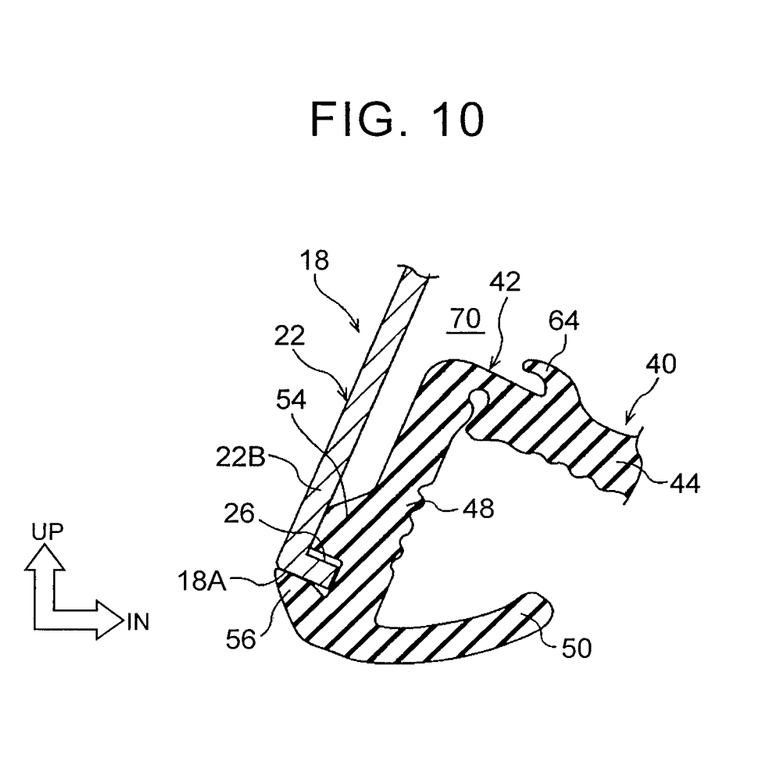
FIG. 10 is an enlarged sectional view corresponding to FIG. 9, of a door frame and a door glass run according to a modified example of the second example embodiment of the invention.

With the vehicle press door structure according to this example embodiment shown in FIG. 9, a lower end portion of a door outer panel 22 that forms a door frame 18 is formed by V-shaped hemming in which the lower end portion is bent toward the vehicle width direction inside. This bent terminal portion is a vehicle outside engageable portion 26. The vehicle outside engageable portion 26 is engaged with a vehicle outside engaging portion 54 of a door glass run 40.

The vehicle press door structure according to the example embodiment is able to obtain the same operation and effects as those obtained by the vehicle press door structure according to the first example embodiment. Also, with the vehicle press door structure according to this example embodiment, the vehicle outside engageable portion 26 is formed by a terminal portion of an inner peripheral end portion 22B of the door outer panel 22 by the V-shaped hemming. This terminal portion has a shape that slightly bites into the boundary location between the vehicle outside engaging portion 54 and the vehicle inside side portion 48 of the door glass run main body 42. Therefore, the engagement of the vehicle outside engaging portion 54 into the vehicle outside engageable portion 26 is able to be improved.

Modified Example of the Door Frame and Door Glass Run

With the vehicle press door structure according to the modified example of the example embodiment shown in HG 10, a lower end portion of the door outer panel 22 is formed by standing flange processing in which the lower end portion is bent substantially perpendicular toward the vehicle width direction inside. This bent portion is a vehicle outside engageable portion 26. The vehicle outside engageable portion 26 is engaged with the vehicle outside engaging portion 54 of the door glass run 40. Also, a vehicle outside engaging portion 54 of the door glass run 40 moves toward the vehicle outside retaining portion 56 side, matching the shape of the vehicle outside engageable portion 26, such that the bent portion (i.e., the vehicle outside engageable portion 26) is sandwiched by the vehicle outside engaging portion 54 and the vehicle outside retaining portion 56.

With the vehicle press door structure according to this modified example, the vehicle outside engageable portion 26 is formed on the inner peripheral end portion 22B of the door outer panel 22 by standing flange processing, so the structure of the vehicle outside engageable portion 26 is able to be simplified.

Supplemental Description of the Example Embodiments

The invention is not limited to the example embodiment described above. Various modifications are also possible within the scope of the invention. For example, the modified examples described below are also in the invention. The door glass run of the invention may also include a vehicle outside seal portion and a vehicle inside seal portion on a base portion of the door glass run main body, as well as an intermediate seal portion between the vehicle outside seal portion and the vehicle inside seal portion. In this case, the seal portion has a triple seal structure that provides a triple block from the outside of the vehicle toward the inside of the vehicle. Also, the seal portion may also have a quadruple or greater seal structure. Moreover, the structure may also be provided with either the vehicle outside engageable portion and the vehicle outside engaging portion, or the vehicle inside engageable portion and the vehicle inside engaging portion.

The invention claimed is:

1. A vehicle press door structure comprising:
   a door frame in which an open portion having a recess-shaped cross-section that is open to an inner peripheral side is formed by a door outer panel, and a door inner panel arranged on a vehicle width direction inside of the door outer panel;
   a door glass run that has lip portions that respectively extend toward a center side from both side portions of a door glass run main body having a recess-shaped cross-section and slidingly contact a door glass, the door glass run being fit into the open portion with a base portion between both of the side portions of the door glass run main body opposing an inside wall of the door inner panel;
   a seal portion that protrudes from the base portion and contacts the inside wall of the door inner panel, and extends in a length direction of the door glass run main body, the door glass run has a vehicle outside engaging portion that is engaged with the door outer panel;
   a bent extended portion in which the door inner panel curves and extends toward the inner peripheral side is provided on an edge portion of the door inner panel on the vehicle width direction inside, which opposes the base portion; and the bent extended portion, the inside wall, and an inside wall of the door outer panel form a housing and retaining portion that at least houses the base portion, and retains the door glass run main body by pushing the door glass run main body against the inside wall of the door outer panel; and
   a vehicle outside seal portion and a vehicle inside seal portion have a shape in which a separation distance therebetween gradually becomes wider toward the inside wall, and a tip end in a protruding direction of the vehicle inside seal portion is elastically pressed against the bent extended portion, wherein
   a portion of the tip end in the protruding direction of the vehicle inside seal portion contacts the bent extended portion between a lateral wall and an inclined wall of the housing and retaining portion.

2. The vehicle press door structure according to claim 1, wherein
   the door outer panel is a plate-shaped door outer panel that extends with a direction along a peripheral edge of a window opening as the length direction, and a vehicle outside surface of the door outer panel is a door outer surface, and
   the door inner panel is arranged on a vehicle width direction inside of this door outer panel, and a vehicle inside surface of the door inner panel is a door inner surface.

3. The vehicle press door structure according to claim 2, wherein
the door outer panel includes a vehicle outside engageable portion in which an end portion on the inner peripheral side of the door outer panel is bent toward the vehicle width direction inside; and
a vehicle outside side portion of the door glass run main body, which is positioned on a vehicle width direction outside of both of the side portions of the door glass run main body, includes a vehicle outside engaging portion that engages with the vehicle outside engageable portion, and that fits the door glass run into the open portion.

4. The vehicle press door structure according to claim 1, wherein
the seal portion includes a vehicle outside seal portion that protrudes from a vehicle width direction outside of the base portion, and a vehicle inside seal portion that protrudes farther from the vehicle width direction inside than the vehicle outside seal portion, the vehicle outside seal portion and the vehicle inside seal portion having a shape in which a separation distance therebetween gradually becomes wider or narrower toward the inside wall.

5. The vehicle press door structure according claim 1, wherein
a portion on the vehicle width direction inside of the door inner panel is formed with a U-shaped cross-section that is open on a open portion side and protrudes toward the vehicle width direction inside, and an inside wall of an edge portion on the open portion side of the door inner panel is a vehicle inside engageable portion, and a vehicle inside engaging portion that is engaged with the vehicle inside engageable portion and fits the door glass run into the open portion side is provided on an end portion on a side opposite the base portion, of a vehicle inside side portion that is positioned on the vehicle width direction inside of both of the side portions of the door glass run main body.

* * * * *